United States Patent [19]

Kuisma

[11] Patent Number: 4,589,054
[45] Date of Patent: May 13, 1986

[54] CAPACITIVE PRESSURE DETECTOR INDEPENDENT OF TEMPERATURE

[75] Inventor: Heikki T. Kuisma, Helsinki, Finland

[73] Assignee: Vaisala Oy, Helsinki, Finland

[21] Appl. No.: 701,864

[22] Filed: Feb. 15, 1985

[30] Foreign Application Priority Data

Feb. 21, 1984 [FI] Finland .................................. 840701

[51] Int. Cl.$^4$ .......................... H01G 7/00; G01L 9/12
[52] U.S. Cl. ...................................... 361/283; 73/718
[58] Field of Search .................. 73/718, 724; 361/283

[56] References Cited

U.S. PATENT DOCUMENTS

| | | | |
|---|---|---|---|
| 4,158,217 | 6/1979 | Bell | 361/283 |
| 4,257,274 | 3/1981 | Shimada et al. | 73/718 |
| 4,386,453 | 6/1983 | Giachino et al. | 361/283 X |
| 4,390,925 | 6/1983 | Freud | 361/283 |
| 4,467,394 | 8/1984 | Grantham et al. | 361/283 |

FOREIGN PATENT DOCUMENTS 55732  4/1983  Japan ..................................... 73/724

Primary Examiner—Donald A. Griffin
Attorney, Agent, or Firm—Birch, Stewart, Kolasch & Birch

[57] ABSTRACT

A capacitive pressure detector, which comprises a support plate (5, 6; 19), a stationary capacitor plate (4; 7) disposed on the support plate, (5, 6; 19), and a silicon plate (2; 13) disposed on the support plate (5, 6; 19) so that it surrounds the stationary capacitor plate (4; 7), the middle portion of the silicon plate having been made thinner so that it forms membrane-like structure (3; 16) acting as a mobile capacitor plate. The support plate consists of a silicon layer (6; 21) and of a glass layer (5; 20) attached onto said silicon layer and placed against the silicon plate (2; 13), said glass layer being essentially thinner than the silicon layer. Hence, in the combination plate (5, 6; 20, 21) in this way obtained, owing to the elasticity coefficients and thermal expansion coefficients of the different layers (5 and 6; 20 and 21), the difference in thermal expansion between the combination plate (5, 6; 20, 21) and the silicon membrane (3; 16) is essentially reduced.

7 Claims, 4 Drawing Figures

CAPACITIVE PRESSURE DETECTOR INDEPENDENT OF TEMPERATURE

BACKGROUND OF THE INVENTION

1. Field of the Invention

The present invention is concerned with a capacitive pressure detector.

2. Description of the Related Art

In respect of the prior-art technology, reference should be made to the following publications:

[1] U.S. Pat. No. 4,386,453 (Gianchino et al.)
[2] U.S. Pat. No. 4,257,274 (Shimada et al.)
[3] U.S. Pat. No. 4,332,000 (Petersen)
[4] U.S. Pat. No. 4,390,925 (Freud)
[5] U.S. Pat. No. 3,397,278 (Pomerantz)
[6] K. E. Bean, "Anisotropic Etching of Silicon", IEEE Transactions on Electron Devices, Vol. ED-25 (1978) No. 10, pp. 1185-93.

It is well-known that miniaturized capacitive pressure detectors can be made of silicon and glass (cited papers [1] to [4]). Silicon can be processed by means of chemigraphic etching (cited paper [6]), patterned by microlithographic means, and the silicon and glass parts can be joined together by means of an electrostatic method (cited paper [5]).

SUMMARY OF THE INVENTION

Suitable for use in detectors are, e.g., Corning Glass, type 7740, "Pyrex", or the "Tempax" glass of Schott. They contain ions of alkali metals, which is favourable for the formation of an electrostatic joint. The thermal expansion of these glasses is also of the same order of magnitude as compared with silicon. At room temperature, the thermal expansion coefficient of silicon is 2.5 ppm/°C., and that of the noted glasses about 3.2 ppm/°C. At higher temperatures, silicon expands non-linearly and exceeds the corresponding coefficient of glass.

The difference in the thermal expansion coefficients, about 0.7 ppm/°C., is the most important factor affecting the dependence on temperature of capacitive pressure detectors of silicon-glass construction.

FIG. 1 is a schematical illustration of the basis for the dependence on temperature in a capacitive pressure detector. A silicon piece 2 provided with a thin portion 3 deflected by the effect of pressure is attached to a glass plate 1 by means of an electrostatic method (cited paper [5]). The difference in pressure effective across the portion 3 deflects said portion 3 and changes the distance between it and a stationary capacitor plate 4 placed on the glass plate 1, and the capacitance between them.

If the thermal expansion coefficients of silicon and glass are of different magnitude, when the temperature rises, a horizontal force F arises in the portion 3 sensitive to pressure. If the glass expands more than silicon, the force F attempts to reduce the deflection caused by the pressure P in the portion 3. If the sensitivity to pressure of the deflection without the force F is $S_o$, with the effective force F it is $$S = \frac{S_o}{1 + K(a/h)^2 \epsilon_{Si}}, \quad (1)$$

wherein a is the side of the membrane 3 (if the membrane is square) or the diameter of the membrane 3 (if the membrane is circular), the coefficient K is 0.27 in the case of a square membrane and 0.2 in the case of a circular membrane, and $\epsilon_{Si}$ is the deformation (elongation) caused by the force F in the silicon membrane 3.

If the glass part 1 is much thicker than the silicon part 2, the following equation applied approximately:

$$\epsilon_{Si} = \Delta\alpha\Delta t, \quad (2)$$

wherein $\Delta\alpha$ is the difference between the thermal expansion coefficients of silicon and glass and $\Delta t$ is the change in temperature.

$S_o$ and $\epsilon_{Si}$ are dependent on temperature. The dependence on temperature of $S_o$ results from the dependence on temperature of the coefficients of elasticity of silicon. The temperature coefficient of the sensitivity S is $$\frac{1}{S}\frac{\partial S}{\partial T} = -\frac{K(a/h)^2 \Delta\alpha}{1 + K(a/h)^2 \epsilon_{Si}} + \frac{1}{S_o}\frac{\partial S_o}{\partial T} \quad (3)$$

With silicon at (100)-level $(1/S_o)(\delta S_o/\delta T) \approx 70$ ppm/°C. If the value $a/h = 20$ is chosen, $(1/S)(\delta S/\delta T)$ β is obtained, i.e., the phenomena cancel each other. However, the ratio $a/h = 20$ is suitable only for detectors measuring rather high pressures (about 50 bars).

If the pressure to be measured is lower than 1 bar, an appropriate ratio is $a/h \gtrsim 80$. That results in a temperature coefficient $\gtrsim 1000$ ppm/°C.

Thus, it should be possible to reduce the difference in the thermal expansion coefficients $\Delta\alpha$ in order that detectors intended for low pressure ranges should be stable relative the temperature. A suitable glass quality, whose thermal expansion coefficient were closer to that of silicon, is, however, not commercially available. The thermal expansion of the support plate 1 can, however, be brought to the desired level by means of the construction shown in FIG. 2.

It is an object of the present invention to eliminate the above drawback and to bring the thermal expansion of the support plate in the pressure detector to the desired level.

The invention is based on the following ideas:

The temperature coefficient of the sensitivity of a capacitive pressure detector can be minimized when the difference in the thermal expansion of the insulating support plate and of the pressure-sensitive silicon membrane is adjusted to such a level that it overrules the temperature-dependence of the elastic properties of silicon.

The insulating support plate consists of glass and silicon plates joined together.

The thermal expansion coefficient of the support plate of sandwich structure can be brought to the desired level by selecting the thicknesses of the silicon and glass layers appropriately.

In the sandwich structure, silicon and glass are joined together by means of an electrostatic method (cited paper [5]).

The thickness of the glass layer is from 50 μm to 1 mm.

More specifically, the pressure detector in accordance with the invention includes a support plate which consists of a silicon layer and of a glass layer attached onto the silicon layer and placed against the silicon plate, with the glass layer being essentially thinner than the silicon layer so that in the combined support plate, owing to the elasticity coefficients and thermal expansion coefficients of the different layers, the difference in thermal expansion between the combined support plate and the silicon membrane is essentially reduced.

By means of the invention, remarkable advantages are obtained. Thus, by means of the invention, it is possible to regulate the temperature coefficient of the insulating support plate in the capacitive pressure detector in the desired way.

BRIEF DESCRIPTION OF THE DRAWINGS

The invention will be examined in more detail in the following with the aid of the exemplifying embodiments shown in FIGS. 2 to 4.

DESCRIPTION OF THE PREFERRED EMBODIMENTS

Figure 1:
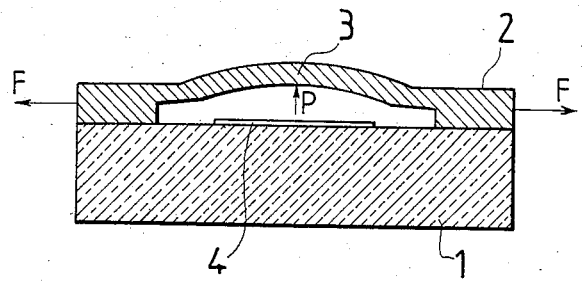
Figure 2:
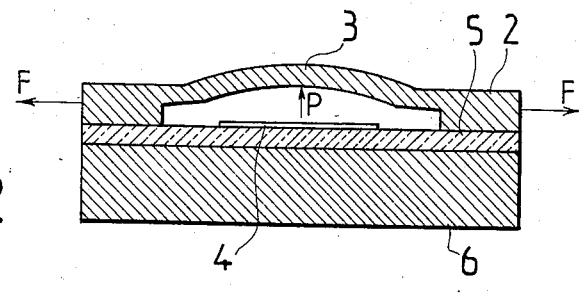
FIG. 2 is a sectional side view of one detector in accordance with the invention.

In FIG. 2, the thick glass part 1 shown in FIG. 1 has been replaced by a thin glass 5 and a thicker silicon plate 6 joined together. The parts 5 and 6 can be joined together best by means of the electrostatic method of cited paper [5].

When the silicon plate 6 is thick as compared with the glass plate, the deflection can be overlooked, and the thermal expansion coefficient of the sandwich structure can be calculated as follows:

$$\alpha = \frac{\alpha_2 + mn\alpha_1}{1 - mn}, \quad (4)$$

wherein $\alpha_2$ is the thermal expansion coefficient of silicon and $\alpha_1$ that of glass, m is the ratio of the thicknesses of the glass and the silicon, and n is the ratio of the coefficients of elasticity of glass and silicon.

The difference between the temperature coefficients of silicon and the sandwich structure (5, 6) is $$\Delta\alpha = \frac{mn(\alpha_1 - \alpha_2)}{1 + mn} \quad (5)$$

In the case of glass and silicon, n=0.36. If we choose m=0.5, we obtain $\Delta\alpha \approx 0.15 \ (\alpha_1 - \alpha_2)$. Thus, it is possible to reduce the mismatching between the thermal expansion coefficients of silicon and glass essentially. By selecting the ratio m of the thicknesses of the glass and silicon plates appropriately, it is possible to reach a situation in which the temperature dependencies of the difference in thermal expansions and of the elasticity coefficients overrule each other.

Figure 3:
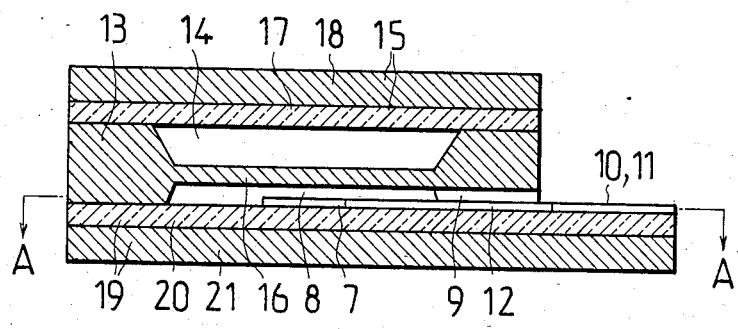
FIG. 3 is a sectional side view of a second detector in accordance with the invention.
Figure 4:
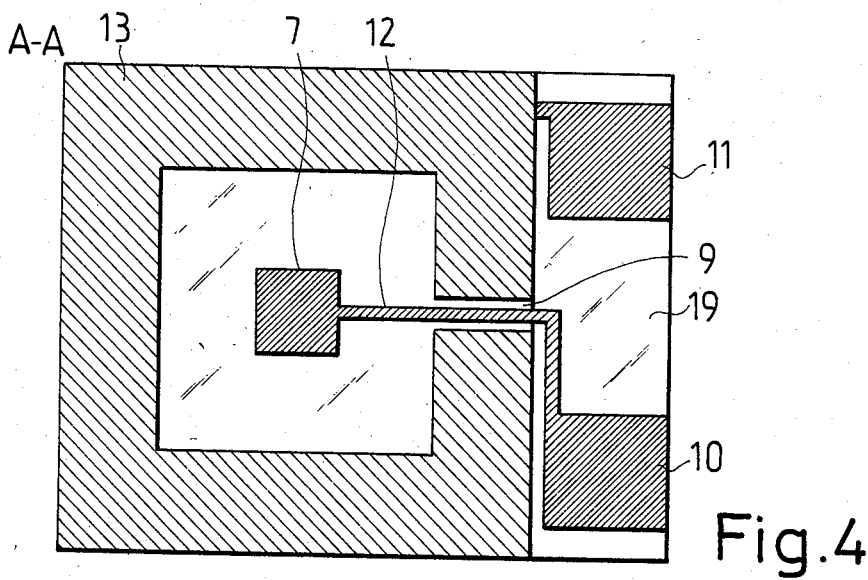
FIG. 4 shows a section along plane A—A in FIG. 3.

The invention can also be applied, e.g., to the construction of a detector for absolute pressure in accordance with FIGS. 3 and 4. Into a silicon piece 13, a cavity 14 has been machined for a vacuum capsule as well as a recess 8 for the gap between the plates of a pressure-sensitive capacitor. The vacuum capsule is closed by a plate 15, which consists of a thinner glass layer 17 and of a thicker silicon plate 18. The plates 17 and 18 have first been joined together by means of an electrostatic method (cited paper [5]). Thereupon the sandwich structure 15 has been attached in a vacuum to the silicon piece 13 by means of the same method.

As part of the silicon piece 13, a thin silicon membrane 16 is disposed between the vacuum capsule 14 and the gap 8 between the capacitor plates. The silicon membrane 16 is deflected towards the vacuum capsule 14 by the effect of external pressure. The silicon piece 13 is attached to a support piece 19. The face of the support piece 19 is made of an insulating material, and onto it a thin metal film has been deposited into which a stationary capacitor disc 7, a conductor 12, and terminal areas 10 and 11 have been patterned. A capacitor sensitive to pressure is formed between the flexible silicon membrane 16 and the deposited metal pattern 7. The capacitance of the detector can be measured across the terminal areas 10 and 11. The terminal area 11 makes an electric contact with the silicon piece 13, and the terminal area 10 is in conductive contact with the metal pattern 7 via the conductor 12, which runs along a tunnel 9. The pressure to be measured can also act upon the silicon membrane 16 via the tunnel 9. The support piece 19 consists of a thin glass layer 20 and of a silicon plate 21, which have been attached to each other by means of an electrostatic method (cited paper [5]). The silicon piece 13 is attached to the support plate 19 by the same method.

The temperature dependence of the pressure detector construction described herein is essentially lower than that of a construction in which the plate 15 closing the vacuum capsule 14 and the support plate 19 are made exclusively of glass. Since the pressure detector construction is symmetrical, the torque dependent on the temperature and derived from the sandwich structure of the plates 15 and 19 overrule each other.

Within the scope of the invention, it is also possible to conceive solutions different from the exemplifying embodiments described above. Thus, as the support plate, it is also possible to use a silicon plate onto which an insulating film has been deposited. However, the film must be thick in order to avoid stray capacitances, and the depositing of a thick film is slow and costly. The joining of a polished glass plate by means of the electrostatic method (cited paper [5]) is a rapid and inexpensive step of work.

The dimensioning of the embodiment according to FIGS. 3 and 4 is as follows (typical ranges in parentheses):

| Glass plates 17 and 20 | | |
|---|---|---|
| width: | 4 mm | (2 to 6 mm) |
| thickness: | 100 μm | (10 to 200 μm) |
| Silicon plates 18 and 21 | | |
| width: | 4 mm | (2 to 6 mm) |
| thickness: | 1 mm | (0.5 to 1.5 mm) |
| Silicon plate 13 | | |
| thickness of plate: | 0.4 mm | (0.2 to 0.5 mm) |
| thickness of membrane: | | 5 to 200 μm (depending on pressure) |
| Stationary capacitor plate 7 and terminals 10 and 11 | | |
| thickness: | 0.2 μm | (0.1 to 1.0 μm) |
| Capacitor gap 8 | | |
| width: | 4 μm | (1 to 10 μm). |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A capacitive pressure detector, which comprises a support plate, a stationary capacitor plate disposed on the support plate, and a silicon plate disposed on the support plate so that it surrounds the stationary capacitor plate and having a thin middle portion forming a membrane-like structure acting as a mobile capacitor plate and the bottom of a vacuum capsule, wherein the support plate consists of a silicon layer and of a glass layer attached onto said silicon layer and placed against the silicon plate, said glass layer being essentially thinner than the silicon layer so that in the combined support plate, owing to the elasticity coefficients and thermal expansion coefficients of the different layers, the difference in thermal expansion between the combined support plate and the silicon membrane is essentially reduced.

2. Detector as claimed in claim 1, functioning as an absolute pressure detector, further comprising a cover plate disposed on the silicon plate and covering the vacuum capsule, this cover plate also comprising a silicon layer and a glass layer attached to said silicon layer and placed against the silicon plate, said glass layer being substantially thinner than the silicon layer.

3. Detector as claimed in claim 2, wherein the silicon layer in each combined support plate is connected to the glass layer by means of an electrostatic method.

4. Detector as claimed in claim 2, wherein the ratio of the thicknesses of the glass and silicon layers of each combined plate has been selected such that the effect of the difference in thermal expansions on the temperature behaviour of the pressure sensitivity of the membrane-like structure is substantially equal, but of opposite direction, as compared with the effect of the temperature dependence of the elasticity coefficient of silicon.

5. Detector as claimed in claim 1, wherein the silicon layer in each combined support plate is connected to the glass layer by means of an electrostatic method.

6. Detector as claimed in claim 5, wherein the ratio of the thicknesses of the glass and silicon layers of each combined plate has been selected such that the effect of the difference in thermal expansions of the temperature behaviour of the pressure sensitivity of the membrane-like structure is substantially equal, but of the opposite direction, as compared with the effect of the temperature dependence of the elasticity coefficient of silicon.

7. Detector as claimed in claim 1, wherein the ratio of the thicknesses of the glass and silicon layers of each combined plate has been selected such that the effect of the difference in thermal expansions on the temperature behaviour of the pressure sensitivity of the membrane-like structure is substantially equal, but of opposite direction, as compared with the effect of the temperature dependence of the elasticity coefficient of silicon.

* * * * *